United States Patent
Santosuosso

(10) Patent No.: US 7,031,958 B2
(45) Date of Patent: Apr. 18, 2006

(54) PATTERNED BASED QUERY OPTIMIZATION

(75) Inventor: John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/360,397

(22) Filed: Feb. 6, 2003

(65) Prior Publication Data
US 2004/0158551 A1    Aug. 12, 2004

(51) Int. Cl.
*G06F 17/30* (2006.01)
(52) U.S. Cl. .......................................................... 707/3
(58) Field of Classification Search .............. 707/1–10, 707/100–104.1; 717/106
See application file for complete search history.

(56) References Cited

U.S. PATENT DOCUMENTS 5,822,749 A * 10/1998 Agarwal ...................... 707/2
6,865,567 B1 * 3/2005 Oommen et al. ............... 707/2
2004/0167873 A1 * 8/2004 Dettinger et al. ............... 707/2
2005/0028134 A1 * 2/2005 Zane et al. .................. 717/106

* cited by examiner

*Primary Examiner*—Diane Mizrahi
(74) *Attorney, Agent, or Firm*—Patterson & Sheridan, LLP

(57) ABSTRACT

Methods, articles of manufacture, and systems for improving the efficiency of executing queries are provided. Rather than automatically running an optimizer to determine an access plan for each issued query, an access plan may be selected from a series of access plans used for prior executions of the same or a similar query. The series of access plans used for prior queries may define a pattern that may be used to accurately predict the behavior (e.g., execution time) of a future query. For some embodiments, a query group may be established to identify a set of similar queries, for which the optimizer is likely to determine the same access plans. In response to determining an issued query fits within an established query group, an access plan associated with the query group may be selected for executing the query, thus avoiding the processing overhead of wastefully running the optimizer only to determine a previously used access plan.

23 Claims, 8 Drawing Sheets

FIG. 2B

| GROUP ID | QUERY ID (OPTIONAL) | EXECUTION COUNT N | QUERY TEXT | TABLE(S) | WHERE CLAUSE | ACCESS PLAN 1 | EXECUTION TIME 1 | ... | ACCESS PLAN N | EXECUTION TIME N |
|---|---|---|---|---|---|---|---|---|---|---|
| 152 | 153 | 154 | 155 | 156 | 157 | $158_1$ | $159_1$ | | $158_N$ | $159_N$ |

| GROUP ID (OPTIONAL) | QUERY ID | EXECUTION COUNT M | QUERY TEXT | ACCESS PLAN 1 | EXECUTION TIME 1 | ... | ACCESS PLAN M | EXECUTION TIME M |
|---|---|---|---|---|---|---|---|---|
| 162 | 163 | 164 | 165 | $168_1$ | $169_1$ | | $168_M$ | $169_M$ |

161

PATTERNED BASED QUERY OPTIMIZATION

BACKGROUND OF THE INVENTION

1. Field of the Invention

The present invention generally relates to data processing and more particularly to query optimization.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Generally, the DBMS includes a query optimizer component configured to determine the manner in which queries will be processed. The primary task of the optimizer is to determine the most efficient way to execute each particular query against a database. To this end, the optimizer typically determines an access plan for use in executing the query against the database. In general, the access plan contains low-level information indicating precisely what steps the system is to take to execute the query (e.g., using an index, a hash table, bit map, etc.). For any given query, there are a large number of possible access plans that may be chosen. Conventional optimizers are generally configured to determine the best access plan for each query it encounters, based on cost comparisons (i.e., estimated resource requirements, typically in terms of time and space) of available access plans. In selecting the access plan (and comparing associated costs), the optimizer may explore various ways to execute the query. For example, the optimizer may determine if an index may be used to speed a search, whether a search condition should be applied to a first table prior to joining the first table to a second table or whether to join the tables first.

Due to the large number of possible queries and the large number of possible access plans, running the optimizer itself may incur a substantial cost by placing a significant burden on system resources and/or requiring a significant amount of time. One approach to reduce this burden is to limit the number of times the optimizer is run by using the same access plan every time the same query is encountered. This approach is typically limited to situations where the same query is executed multiple times. In many cases, however, for a different, but similar query (e.g., queries with similar selection criteria or WHERE clauses), the optimizer may determine the same access plan. However, conventional optimizers are not designed to recognize similarities in queries and will, thus, wastefully optimize the similar query, although the same access plan will likely be returned.

Accordingly, there is a need for an improved method of optimizing query execution that overcomes the shortcomings of conventional query optimization techniques.

SUMMARY OF THE INVENTION

The present invention generally provides methods, articles of manufacture and systems for optimizing query execution by selecting access plans based on prior query executions.

For some embodiments, a method of optimizing execution of a query generally includes receiving the query, selecting, from a set of one or more access plans used for prior executions of the query or a similar query, an access plan for use in executing the query, and executing the query according to the selected access plan.

For some embodiments, a method of optimizing execution of a query generally includes receiving the query and determining if the query fits within an established group of queries. The method also includes, in response to determining the query fits within an established group of queries, selecting, from a group of access plans used for prior executions of queries within the established group, an access plan for use in executing the query, and executing the query according to the selected access plan.

For some embodiments, the article of manufacture generally includes a computer-readable medium containing a program which, when executed by a processor, performs operations for optimizing execution of a query. The operations generally include receiving the query, selecting, from a set of one or more access plans used for prior executions of the query or a similar query, an access plan for use in executing the query, and executing the query according to the selected access plan.

For some embodiments, the system generally includes a database, a query optimizer, one or more records, each containing a set of access plans used in prior executions of a query or a group of similar queries, and a query execution component. The query execution component is generally configured to receive a query and execute the query against the database according to an access plan selected from one of the records or an access plan generated by the query optimizer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2B and 2C illustrate an exemplary grouped query record and an exemplary query execution record, respectively.

DETAILED DESCRIPTION OF THE PREFERRED EMBODIMENTS

Figure 1:
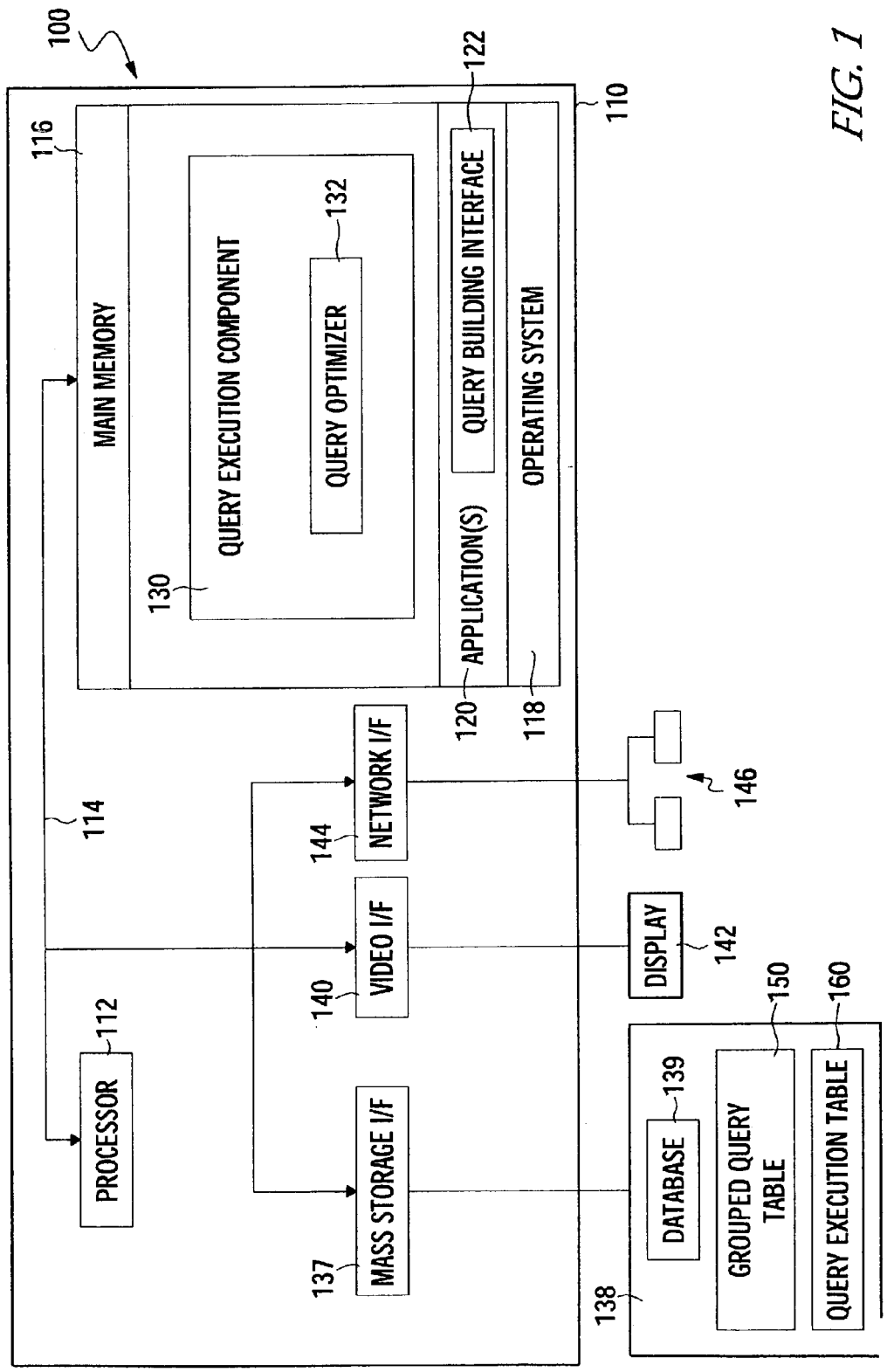
FIG. 1 is a computer system illustratively utilized in accordance with the present invention.

The present invention generally is directed to systems, methods and articles of manufacture for improving the efficiency of executing a query. Rather than automatically running an optimizer to determine an access plan for each issued query, an access plan may be selected from a series of access plans used for prior executions of the same or a group of similar queries. The series of access plans used for prior query executions may define a pattern that may be used to accurately predict the behavior (e.g., execution time) of a future query. For some embodiments, a query group may be established to identify a set of similar queries, for which the optimizer is likely to determine the same access plans. In response to determining an issued query fits within an established query group, an access plan associated with the query group may be selected for executing the query, thus avoiding the processing overhead of wastefully running the optimizer only to determine a previously used access plan.

As used herein, the term access plan generally refers to any type of information indicating what steps the system is to take to execute a query including, but not limited to, information such as indexes to use, an order of applying search conditions, joining tables, etc. Further, in some instances, an access plan may include multiple sets of steps, where each set of steps may be regarded as an individual access plan. However, to facilitate understanding, the following description will refer to the multiple sets of steps, taken as a whole, as a single access plan.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked servers, networked printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, main memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The main memory 116 is shown configured with an operating system 118. The operating system 118 is the software used for managing the operation of the computer system 110. Examples of the operating system 118 include UNIX, Microsoft Windows®, and the like. As illustrated, the main memory 116 further includes at least one application 120 and a query execution component 130. The application 120 and the query execution component 130 are software products comprising a plurality of instructions that are resident at various times in various memory and storage devices in the computer system 110. When read and executed by one or more processors 112 in the computer system 110, the application 120 and the query execution component 130 cause the computer system 110 to perform the steps necessary to execute steps or elements embodying the various aspects of the invention.

The application 120 (and more generally, any requesting entity, including the operating system 118) is configured to run (i.e., issue/execute) queries against a database 139 (illustratively shown as resident in the DASD 138) via the query execution component 130. The queries issued by the application 120 may be created and/or specified by a user via a query building interface 122, which may be included with the application 120. The queries may be generated (e.g., by a user) via the query building interface 122 by specifying query conditions, for example, through one or more graphical user interface (GUI) screens. The application 120 may send the generated queries to the query execution component 130 for execution. As illustrated, the query execution component 130 may include a query optimizer 132 for optimizing received queries prior to execution.

Pattern-Based Query Optimization

In accordance with aspects of the present invention, and in contrast to conventional query optimization techniques, the query execution component 130 may be generally configured to examine information regarding optimizations performed on prior executions of a query, or a similar query, prior to running the query optimizer 132. Information regarding optimizations performed on prior executions of queries may be stored in a grouped query table 150 and/or a query execution table 160. For example, the tables 150 and 160 may include access plans used for previously executed queries along with corresponding execution times.

Figure 2A:
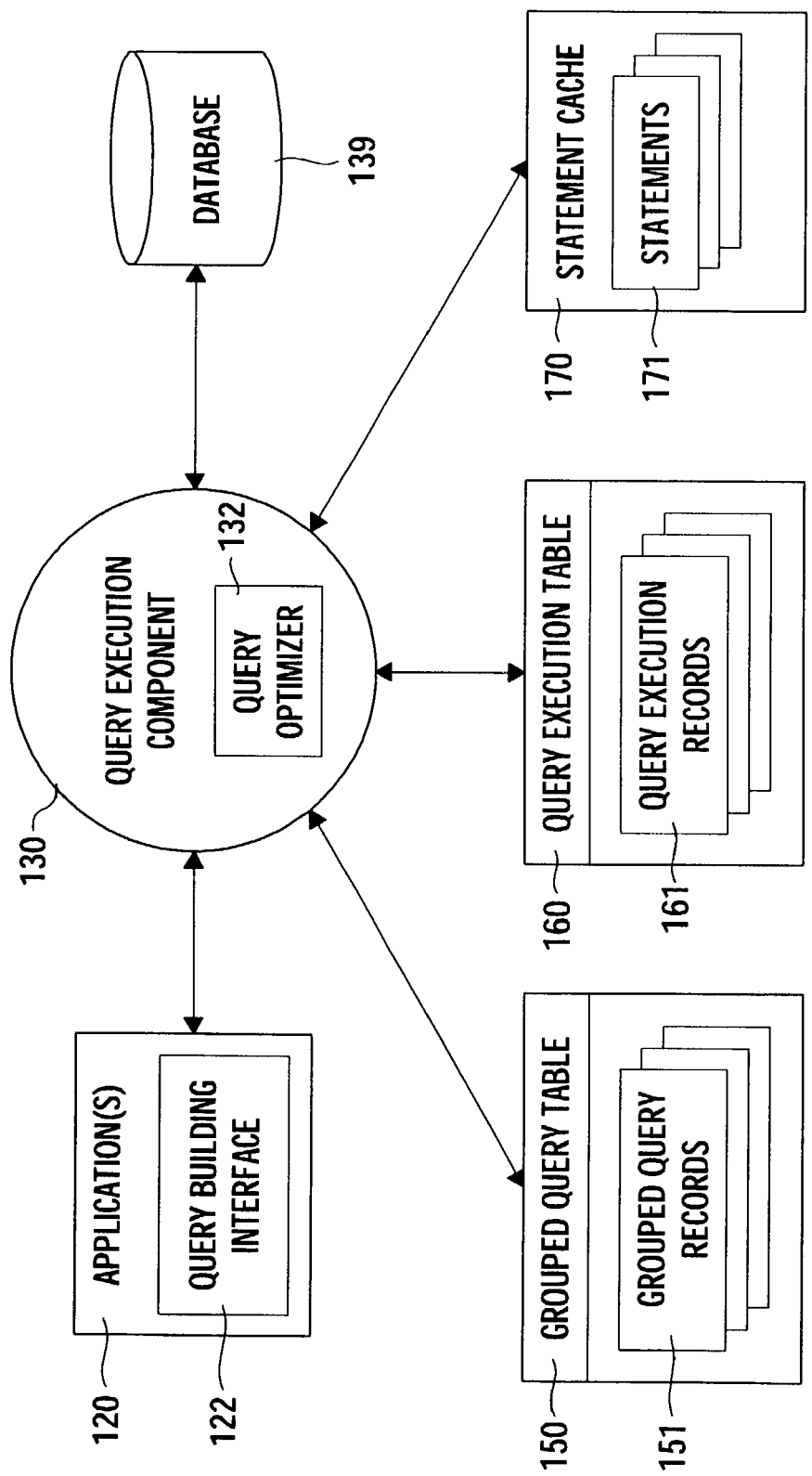
FIG. 2A is a relational view of software components of one embodiment of the present invention.

FIG. 2A illustrates a relational view of the application 120, query execution component 130, database 139, grouped query table 150, and query execution table 160, according to one embodiment of the invention. In general, in response to receiving a query from the application 120 (or any requesting entity), the query execution component 130 may be configured to determine whether to run the optimizer 132 to generate an access plan or to select an access plan from the grouped query table 150 or query execution table 160, thus avoiding running the query optimizer 132 and the associated processing overhead.

As illustrated, the grouped query table 150 may include a set of grouped query records 151, each of which contains a set of access plans used for prior executions of a group of similar queries. In general, the queries within a query group may be related in that their optimizations are in all likelihood the same or similar. In other words, the optimizer 132 would likely determine the same access plan, or set of access plans for each query within a query group. As an example, queries within a query group may share a common set of criteria (e.g., SQL WHERE clauses), that causes the query optimizer 132 to generate the same or similar access plans. In contrast, the grouped query table 160 may include a set of query records 161, each of which contains a set of access plans used for prior executions of the same query. In other words, whereas each grouped query record 151 may correspond to a number of related queries, each query execution record 161 may correspond to a single query.

Accordingly, an advantage to query grouping is that a relatively small grouped query table 150 may be used to select access plan for executing a relatively large number of queries. A further advantage to query grouping is that a grouped query table 150 may be generated (as described in greater detail below) by monitoring the execution of a relatively small number of queries. An advantage to a query execution table 160 is that, because each query execution record 161 contains a set of access plans used for prior executions of the same query, a more accurate prediction of the behavior of executing the query with a selected one of the access plans may be made. Regardless, various embodiments of the present invention may include both the grouped query table 150 and the query execution table 160, just the grouped query table 150, or just the query execution table 160. Further, for some embodiments, query grouping may be enabled/disabled via a user-selectable option.

FIGS. 2B and 2C illustrate an exemplary grouped query record 151 and query execution record 161, respectively. As shown, the grouped query record 151 may include a group ID field 152, optional query ID field 153, an execution count field 154, query text field 155, tables field 156, and where clause field 157. The grouped query record 151 may also include a set of access plan fields 158 ($158_{1 \ldots N}$) to hold a series of access plans used for previous executions of queries from the group. To allow a determination of an optimal access plan, the grouped query record may also include a set of execution time fields 159 ($159_{1 \ldots N}$) to hold execution times corresponding to the previously used access plans. In other words, the execution time of field $159_1$ corresponds to a prior execution of a query using the access plan of field $158_1$.

The group ID field 152 may identify the establish query group corresponding to the record 151. The optional query ID field 153 may be used to further classify queries within a query group and/or as a cross reference to a related query execution record 161. For some embodiments, the query execution component 130 locate a grouped query record for a query based on the query ID. For example, the query execution component 130 may receive a query and generate a group ID (e.g., via a lookup table) based on a where clause contained in the query.

As an alternative, the query execution component 130 may retrieve a grouped query record 151 for use in selecting an access plan for executing a query based on a search of the query test field 155, tables field 156 or where clause field 157. As an example, the query execution component 130 may search the where clause field 157 of grouped query records 151 in the grouped query table 150 for a match to a where clause of a query. The query execution component 130 may then select an access plan 158 from a grouped query record 151 with a where clause field 157 that matches a where clause of the query.

The execution count field 154 may indicate the number of times (N) queries within the group have been executed, and generally correlates to the number of entries (generally defined as an access plan and a corresponding execution time) in the grouped query record 151. As will be described in greater detail below, for some embodiments, a minimum number of executions may be required before an access plan is selected from the grouped query record 151. The minimum number of executions may be determined, for example, in an effort to ensure a sufficient execution history is established for a query group prior to performing pattern-based optimization.

For example, if the minimum number of executions has not been reached, the optimizer may be run to generate an access plan and the query may be executed using the generated access plan. Subsequently, the generated access plan and corresponding execution time may be entered into the grouped query record 151 and the execution count field 154 incremented. In other words, the period prior to reaching the minimum number of execution times may be regarded as a training period during which query execution history is captured in the form of access plan and execution time entries into the grouped query record 151.

It should be noted that the access plan fields 158 may include multiple entries with the same access plan but different corresponding execution time fields 159. In other words, in different circumstances (i.e., different levels of database usage), the same access plan may result in different execution times. In fact, as will be described in greater detail below, this historical information may be useful when selecting an access plan.

As shown in FIG. 2B, the query execution record 161 may contain similar fields (162–169) to the grouped query record 151, which may serve the same purposes as described above. A particular query record 161 may be identified by a query ID field 163, and may be cross-referenced to a grouped query record 151 via an optional group ID 162. The query execution record 161 may also be identified by a query text field 165, which may be searched to determine a match with the text of an issued query. In different situations, a query execution record 161 may be accessed rather than a grouped query record 151. For example, for some embodiments, query grouping may not be implemented or may be disabled. Accordingly, the query execution record 161 may not have tables or where clause fields (e.g., fields 156 or 157), which may be used to relate queries within a query group.

For some embodiments, the grouped query table 150 and/or the query execution table 160 may be automatically generated and initialized "offline" (e.g., prior to performing pattern-based optimization) using existing information available on the system. For example, query groups may be established by examination of query statements (e.g., static SQL) contained in one or more user programs, such as the applications 120 or to examine query statements 171 contained in a system-wide statement cache 170. For some embodiments, the query execution component 130 may access these query statements and generate an initial set of grouped query records 151 based on common criteria in statements (e.g., where clauses), which may provide an initial framework for capturing execution history and possibly speed the process of group-enabled pattern-based optimization.

Figure 3:
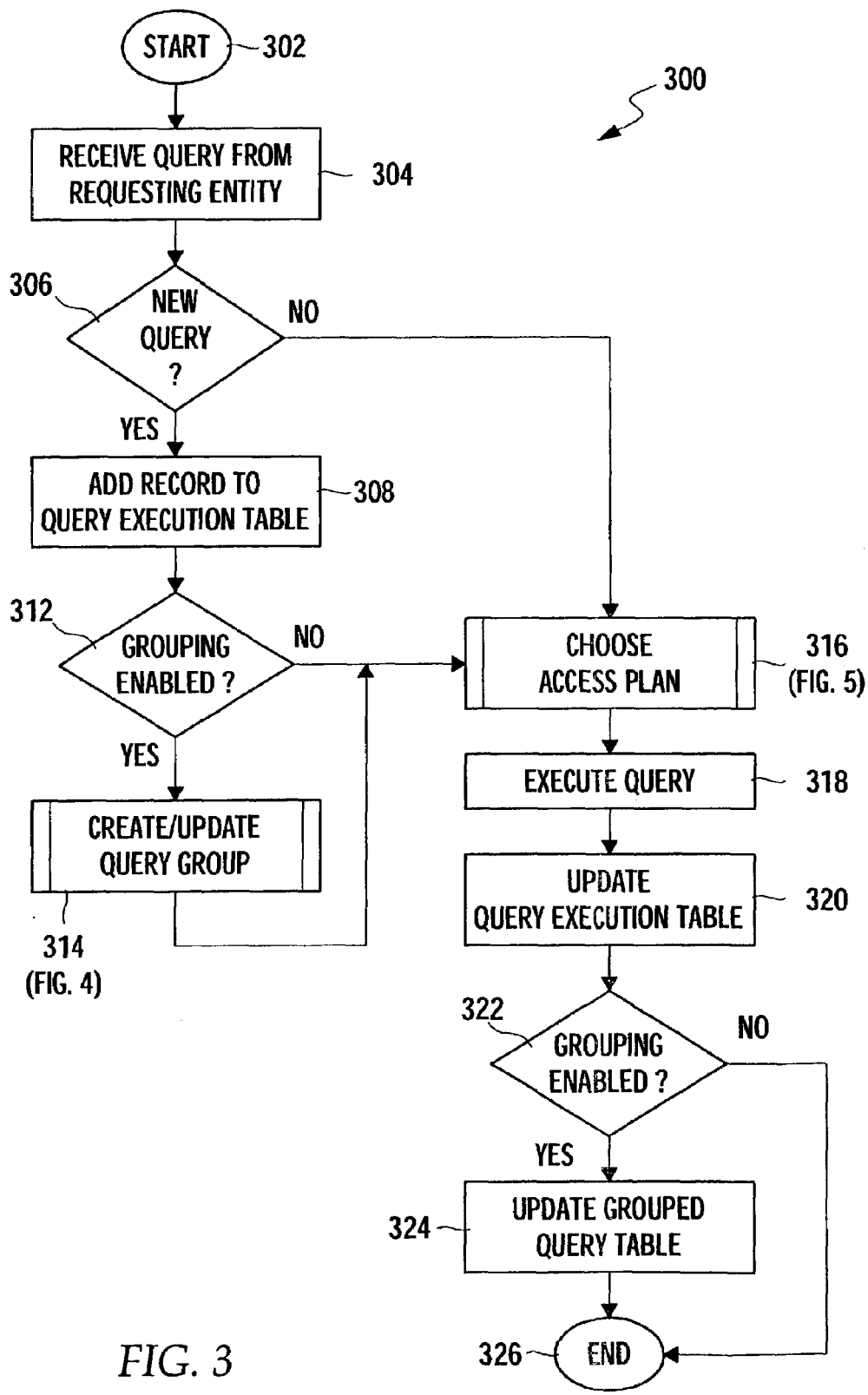
FIG. 3 is a flow chart illustrating exemplary operations for optimizing execution of a query according to aspects of the present invention.

FIG. 3 is a flow diagram of exemplary operations 300 (e.g., that may be performed by the query execution component 130) for performing pattern-based optimization that may be optionally group-enabled. The operations 300 begin at step 302, for example, in response to a user invoking the application 120. At step 304, the query execution component 130 receives a query from a requesting entity, such as the application 120.

At step 306, the query execution component 130 determines if the received query is new (e.g., a record corresponding to the query does not exist in either the query execution table 160 or grouped query table 150). If the query is new, processing proceeds to steps 308–314 to create the necessary framework to begin capturing execution history. For example, at step 308, a query execution record 161 is added to the query execution table 160. At step 312, a determination is made as to whether query grouping is enabled. If query grouping is enabled, a query group is created or updated at step 314 (suitable operations for creating or updating the query group are shown in FIG. 4), prior to choosing an access plan, at step 316.

Alternately, if the query is not new, as determined at step 306, processing proceeds directly to step 316, to choose an access plan. As previously described, an access plan may be chosen from a query execution record 161, grouped query record 151, or may be generated by the optimizer. Suitable operations for choosing an access plan are described in greater detail below, with reference to FIG. 5. Regardless, once the access plan is chosen, the query is executed, at step 318.

In an effort to determine the effectiveness of the chosen access plan, the execution time of the query may be monitored. Accordingly, at step 320, the query execution table 160 may be updated, for example, with an entry of the chosen access plan and monitored execution time to a query execution record 161 corresponding to the executed query. If grouping is enabled, as determined at step 322, a grouped query record 151 in the grouped query table 150 may be updated in a similar manner, at step 324. Thus, the execution history of a query, or group of similar queries may be updated with each execution. Of course, there may be a limit to the number of entries that may be stored in a single record and/or entries may be overwritten. Regardless, the operations 300 are exited at step 326, for example, by returning query results to the application 120.

Figure 4:
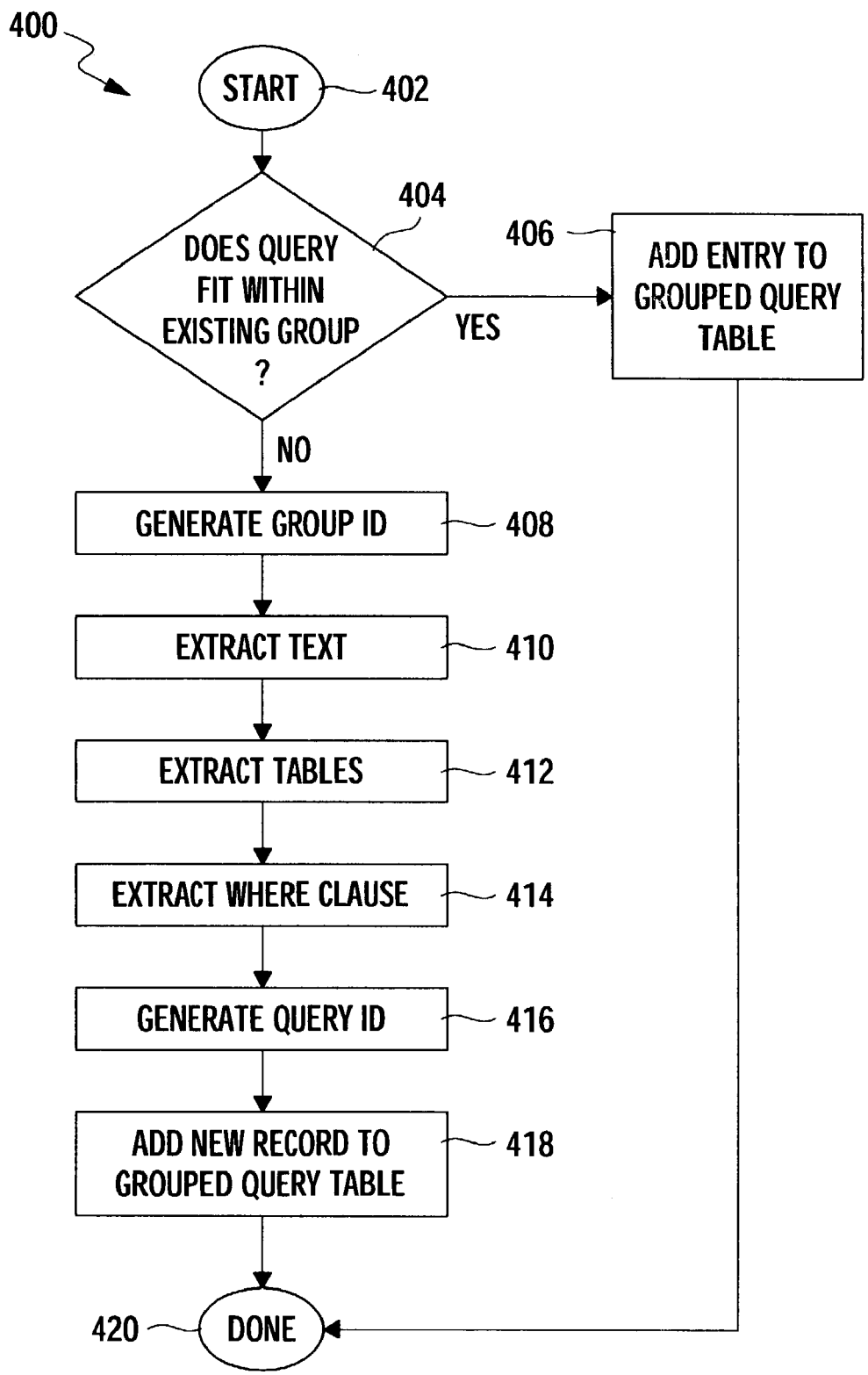
FIG. 4 is a flow chart illustrating exemplary operations for creating or updating a query group according to aspects of the present invention.

FIG. 4 illustrates exemplary operations 400 for creating or updating the grouped query table 150 in response to receiving a new query. At step 402, the operations 400 begin, for example, by receiving the new query. At step 404, a determination is made as to whether the new query fits within an existing query group. For example, as previously described, queries within a group may be related by a same or similar WHERE clause. Therefore, WHERE clause fields 157 of grouped query records 151 may be searched for a match to determine if the query fits within an existing group. If the query fits within an existing query group, an entry is added to the grouped query table 150, at step 406. As previously described, adding the entry may comprise appending, to an existing grouped query record 151, an additional access plan field 158 and corresponding execution time field 159 for holding an access plan to be chosen for the new query and corresponding execution time.

If the query does not fit within an existing query group, a new grouped query record 151 is generated based on the query. For example, values for grouped query fields 152–157 may be generated at steps 408–416. A new record populated with the generated values may be added to the grouped query table, at step 418. Whether a new grouped query record was created or an existing query record was updated, the operations 400 are terminated at step 420, for example, by returning to a main routine (e.g., operations 300), to choose an access plan.

Figure 5:
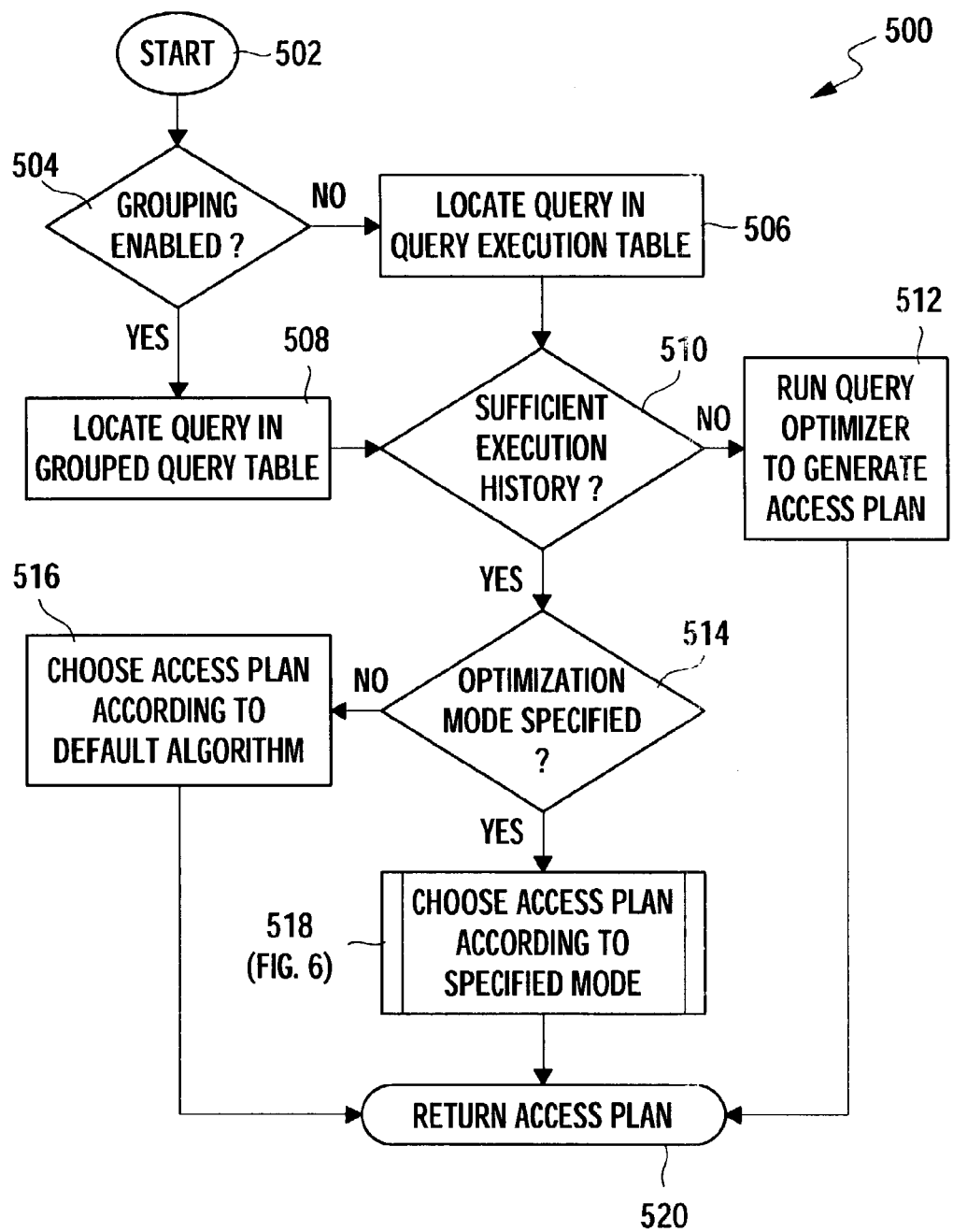
FIG. 5 is a flow chart illustrating exemplary operations for choosing an access plan according to aspects of the present invention.

FIG. 5 is a flow diagram of exemplary operations 500 that may be performed by the query execution component 130 for choosing an access plan for executing a query, according to one embodiment of the present invention. As previously described, the operations 500 may correspond to step 316 of FIG. 3. The operations 500 begin at step 502, for example, after receiving a query (determining if the query is new, updating the query execution table 160 and/or updating the grouped query table 150).

At step 504, a determination is made as to whether query grouping is enabled. If query grouping is enabled, the query is located in the grouped query table 150. More specifically, a grouped query record 151 corresponding to the query may be located in the grouped query table 150. If query grouping is not enabled, (a query execution record 151 corresponding to) the query is located in the query execution table 160.

In either case, at step 510, a determination may be made as to whether there is sufficient execution history for the query to select an access plan from the located record. As previously described, this determination may be based on the number of times the query (or similar queries in a query group) have been executed, which may be indicated by the execution count field 154 or 164. For example, the execution count may be compared against a predetermined threshold value. If the execution count has not reached the threshold value, it may be determined that there is not sufficient execution history for the query (to accurately predict the behavior of executing the query with a previously used access plan) and the optimizer 132 is run, at step 512, to generate an access plan. Accordingly, the optimizer 132 may be run on successive executions until there is sufficient execution history for the query. For some embodiments, the optimizer 132 may also be run if it is determined none of the access plans in the record have a corresponding execution time below a predetermined maximum execution time. In other words, none of the access plans in the record may have resulted in an acceptable execution time.

Referring back to step 510, if there is sufficient execution history for the query (e.g., the execution count has reached, or exceeded, the threshold value), an access plan may be selected from the grouped query record 151 or query execution record 161 located in steps 508 or 506, respectively, thus avoiding the cost of running the optimizer. As previously described, each record may comprise a set of access plans used for prior executions of the query (or other similar queries within a query group). A number of different algorithms may be used to select an access plan from the set of access plans and the access plan selected may be determined by the particular algorithm used.

Figure 6:
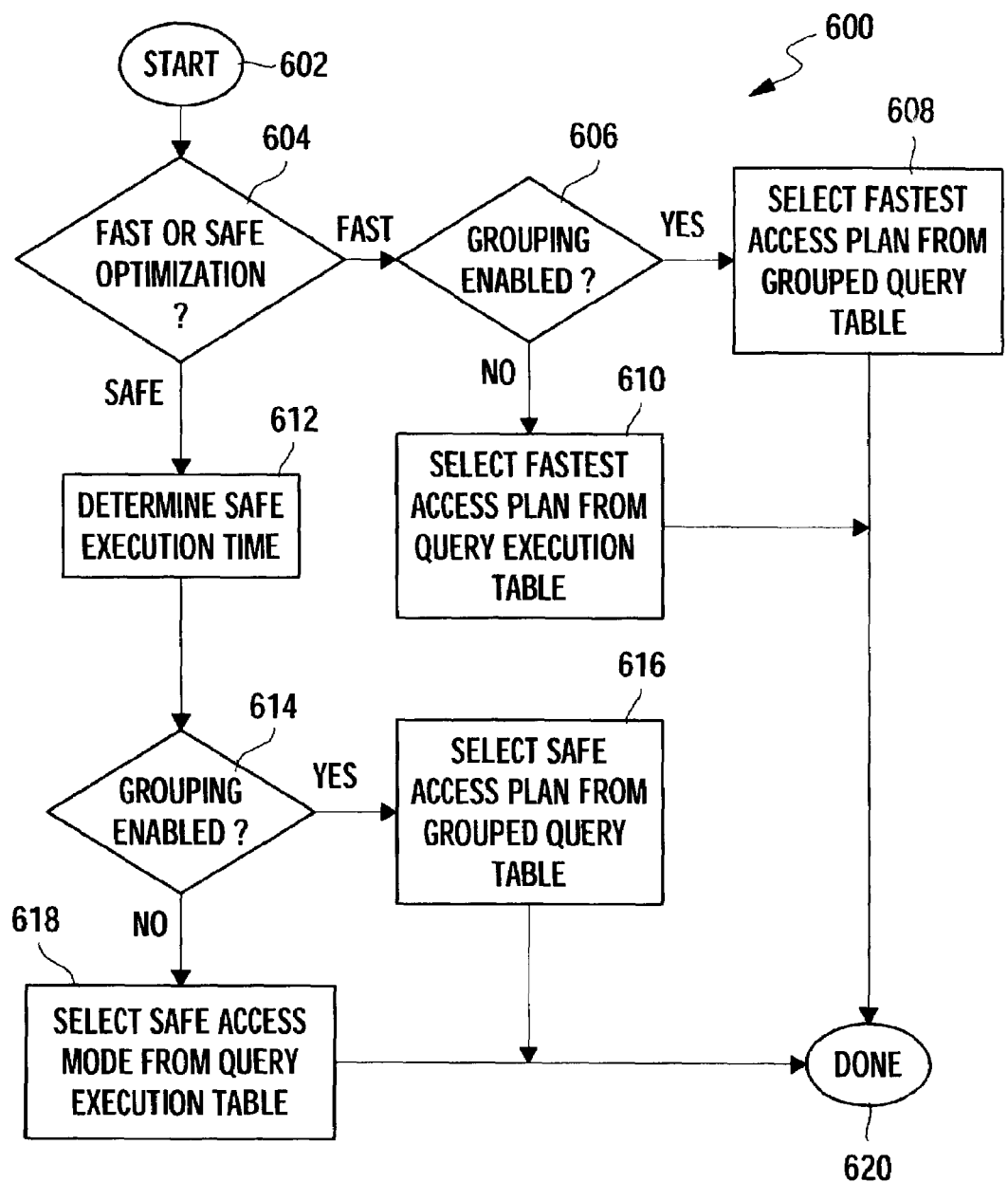
FIG. 6 is a flow chart illustrating exemplary operations for choosing an access plan for specific optimization modes according to aspects of the present invention.

For some embodiments, a user may be able to specify a particular mode of optimization to obtain a desired affect, such as reliable (i.e., safe) or fast execution of the query. Accordingly, at step 514, a determination is made as to whether a particular optimization mode has been specified. If a particular optimization mode has not been specified, at step 516, an access plan is chosen according to a default algorithm, which may be any suitable algorithm (e.g., an access plan with the lowest average corresponding execution times may be chosen). If a particular optimization mode has been specified, at step 518, an access plan is chosen according to the specified optimization mode (FIG. 6 illustrates exemplary operations for choosing an access plan according to two exemplary optimization modes). Regardless, at step 520, the operations are terminated by returning the selected access plan.

Specialized Query Modes

FIG. 6 is a flow diagram of exemplary operations 600 that may be performed by the query execution component 130 for choosing an access plan according to a particular optimization mode. While the query execution component 130 may be configured to implement a variety of optimization modes, to facilitate understanding, the operations 600 are limited to choosing between a FAST mode (for optimizing execution time) and a SAFE mode (for optimizing the likelihood of execution within a specified execution time). Further, for the purposes of the following description, it is assumed that either the FAST or SAFE mode has been previously chosen, for example, by a user. The operations 600 begin at step 602.

At step 604, a determination is made as to whether FAST or SAFE optimization mode has been specified. If the FAST mode has been specified, processing proceeds to step 606, where a determination is made as to whether grouping is enabled. If grouping is enabled, the fastest access plan from the grouped query table 150 is selected, at step 608. In other words, referring back to FIG. 2B, the access plan 158 with the shortest corresponding execution time field 159 from a grouped query record 151 corresponding to the query may be selected. If grouping is not enabled, the fastest access plan from the query execution table 160 may be selected in a similar manner, at step 608 (e.g., the access plan 168 corresponding to the shortest execution time field 169 from a query execution record 151 for the query may be selected).

The SAFE mode may be specified for various situations when it is more important that the query execute within a specified time than that the query execute within the fastest possible time. In other words, certain access plans may result in the shortest execution time in certain situations, and result in an unacceptable execution time in other situations. Fortunately, this situation may be readily determined from a grouped query record 151 or a query execution record 161.

As an example, either type record may include entries (access plan and execution time) for 30 prior executions of the same query using 3 different access plans (plans 1, 2, and 3). Based on the entries, it may be determined that plan 1 results in the fastest execution time (e.g., 5s) under some conditions and an unacceptable execution time (e.g., >1m) under other conditions (which may be indicative of a problem). On the other hand, it may also be determined, based on the entries, that while plans 2 and 3 never result in the fastest execution times (e.g., less than 5s), they also never result in unacceptably high execution times (e.g., above 30s). Accordingly, if it is important that the query execute within an acceptable time, it may be safest to select one of plans 2 or 3 for execution of the query. The query execution component 130 may be configured in a SAFE mode to use plans 2 or 3 to avoid any problems that may be associated with plan 1.

Referring back to step 604, if the SAFE mode has been specified, processing proceeds to step 612, where a safe execution time is determined. For example, the safe execution time may be a user-specified value correspond to a predetermined acceptable execution time. At step 614, a determination is made as to whether grouping is enabled. If grouping is enabled, a safe access plan is selected from the grouped query table 150, at step 616. If grouping is not enabled, a safe access plan is selected from the query execution table 150, at step 616.

In either case, a safe access plan may be any access plan that does not have any corresponding execution times greater than the determined safe execution time. If more than one access plan has no corresponding execution times greater than the determined safe execution time, any suitable algorithm may be used to choose between the two. For example, the access plan with the shortest corresponding execution time, the shortest maximum corresponding execution time, or the shortest average of corresponding execution times may be selected. At step 620, the operations 600 are exited, for example, by returning the selected safe or fastest access plan for use in executing the query.

Figure 7:
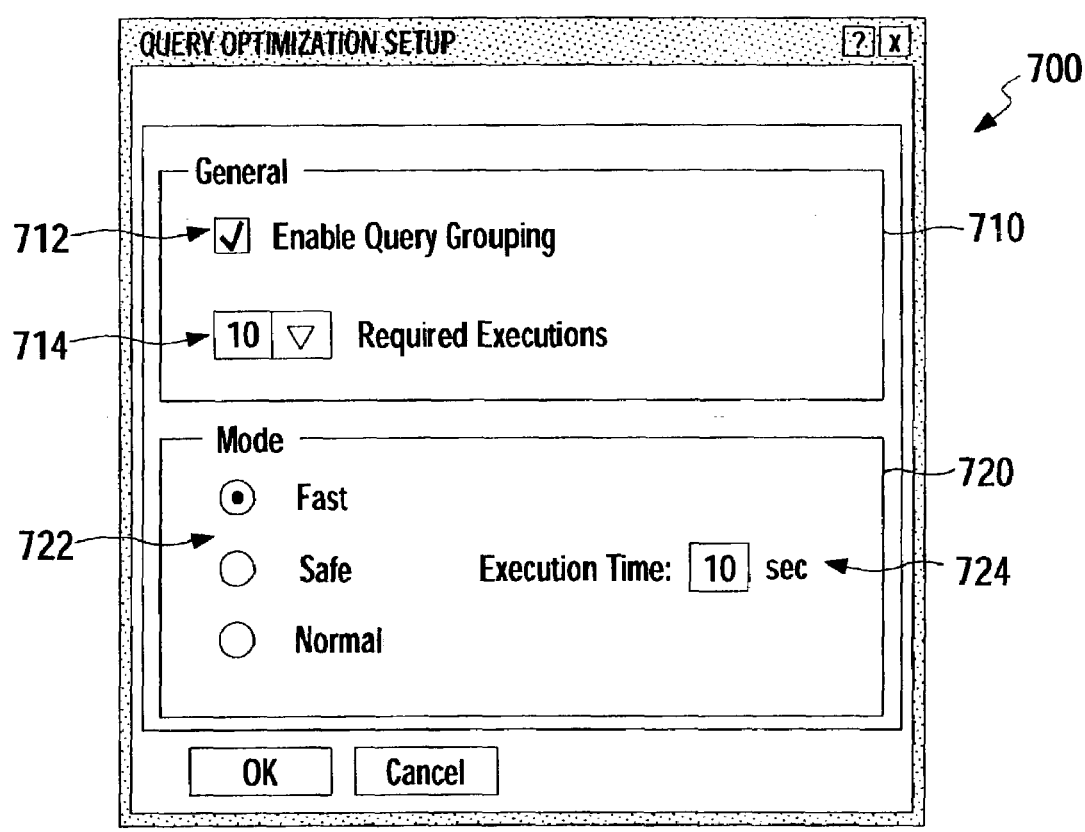
FIG. 7 is an exemplary graphical user interface (GUI) screen for specifying pattern-based optimization options according to aspects of the present invention.

As previously described, for some embodiments, a user may configure certain aspects of pattern-based query optimization by specifying one or more options. For example, the user may specify the options through any suitable interface, such as a command line or one or more GUI screens. For example, FIG. 7 illustrates an exemplary GUI screen 700 that may be presented to a user for specifying pattern-based query optimization options.

As illustrated, the GUI screen 700 may include a window 710 with a check box 712 for enabling query grouping and a pull down menu 714 for specifying a required number of executions before an access plan may be chosen based on the pattern-based optimization techniques described above. As previously described, enabling query grouping may reduce the number of times the optimizer 132 is run by allowing a query to be executed using access plans generated for prior executions of similar queries. While reducing the number of required executions may also reduce the number of times the optimizer is run by reducing the "training period" for establishing a sufficient execution history for using pattern-based optimization, if set too low, the captured pattern of access plans may be too limited to accurately predict the behavior of executed queries.

The GUI screen 700 may also include a window 720 for specifying a particular optimization mode. For example, the window 720 may include radio buttons 722 for specifying a FAST, SAFE, or DEFAULT optimization mode, which may each be implemented as described above. As illustrated, the window 720 may also include an edit box 724 for specifying a safe execution time, to be used for selecting an access plan in the SAFE execution mode. Of course, the GUI screen 700 is for illustrative purposes only, and the exact options presented may vary for different embodiments. For example, some embodiments may not implement query grouping, some embodiments may not implement specific optimizations modes, etc.

CONCLUSION

For some embodiments, an execution history, or pattern of optimizations, for a query may be captured as a set of access plans used for prior executions of the query, or a group of similar queries. By executing a query using an access plan selected from the set of access plans rather than generating a new access plan by running a query optimizer, the number of times the query optimizer is run may be reduced, thereby reducing processing overhead and speeding query execution. Further, by monitoring execution times for previously used access plans, inefficient access plans may be identified and, therefore, avoided.

While the foregoing is directed to embodiments of the present invention, other and further embodiments of the invention may be devised without departing from the basic scope thereof, and the scope thereof is determined by the claims that follow.

What is claimed is:

1. A computer-implemented method of optimizing execution of a query, comprising:
   receiving the query;
   selecting, from a set of one or more pre-existing access plans used for prior executions of one of the query and a similar query, an access plan for use in executing the query; and
   executing the query according to the selected access plan.

2. The method of claim 1, wherein the selecting comprises comparing one or more execution times, each corresponding to a prior execution of the query or a similar query using one of the set of access plans.

3. The method of claim 2, wherein the selecting comprises selecting an access plan having the shortest corresponding execution time.

4. The method of claim 2, wherein the selecting comprises selecting an access plan having a corresponding execution time less than or equal to a predetermined execution time.

5. The method of claim 2, wherein the set of one or more access plans and corresponding execution times are contained in a record and the method further comprises:
   monitoring an execution time of the query; and
   updating the record with the selected access plan and the monitored execution time.

6. A computer-implemented method of optimizing execution of a query, comprising:
   receiving the query;
   determining if the query fits within an established group of queries; and
   in response to determining the query fits within an established group of queries,
      selecting, from a group of ore-existing access plans used for prior executions of queries within the established group, an access plan for use in executing the query, and
      executing the query according to the selected access plan.

7. The method of claim 6, wherein determining if the query fits within an established group of queries comprises searching one or more records, each associated with a different established group of queries.

8. The method of claim 7, further comprising:
   running an optimizer to generate an access plan for the query;
   executing the query according to the generated access plan;
   monitoring an execution time of the query; and
   storing the generated access plan and monitored execution time in a record associated with the newly established group of queries.

9. The method of claim 6, wherein queries within the established group share one or more common query criteria.

10. The method of claim 9, wherein queries within the established group share one or more common SQL WHERE clauses.

11. The method of claim 6, wherein queries within the established group target one or more common tables.

12. The method of claim 6, further comprising establishing one or more groups of queries based an information in a statement cache.

13. The method of claim 6, further comprising establishing one or more groups of queries based on static query statements embedded in an application.

14. The method of claim 6, further comprising, in response to determining the query does not fit within an established group of queries, establishing a new group of queries based on the query.

15. A tangible computer readable medium containing a program which, when executed, performs operations for optimizing execution of a query comprising:
   receiving the query;
   selecting, from a set of one or more pre-existing access plans used for prior executions of one of the query and a similar query, an access plan for use in executing the query; and
   executing the query according to the selected access plan.

16. The computer readable medium of claim 15, wherein the selecting comprises comparing one or more execution times, each corresponding to a prior execution of the query or a similar query using one of the set of access plans.

17. The computer readable medium of claim 16, wherein the set of one or more access plans and corresponding execution times are contained in a record and the operations further comprises:
- monitoring an execution time of the query; and
- updating the record with the selected access plan and the monitored execution time.

18. The computer readable medium of claim 16, wherein the operations further comprise providing a user with a graphical user interface for selecting one or more optimization modes.

19. The computer readable medium of claim 18, wherein at least one of the optimization modes comprises a safe optimization mode and, if the user has selected the safe optimization mode, the selecting comprises selecting an access plan with a corresponding execution time less than or equal to a predetermined execution time.

20. A database system, comprising:
- a processor, a memory and a storage device;
- a query optimizer residing in the memory and executable by the processor;
- one or more records on the storage device, each containing a set of pre-existing access plans used in prior executions of one of the query and a similar query; and
- a query execution component configured to receive a query and execute the query against a database according to a pre-existing access plan selected from one of the records or an access plan generated by the query optimizer, wherein the query execution component executes the access plan generated by the optimizer only after determining that the pre-existing access plans contained in the one or more of the records fail to satisfy predetermined criteria.

21. The database system of claim 20, wherein the query execution component is configured to locate a record corresponding to the query and determine whether to execute the query against the database according to an access plan selected from one of the records or an access plan generated by the query optimizer based on information within the record.

22. The database system of claim 21, wherein the query execution component is configured to execute the query against the database according to an access plan generated by the optimizer in response to determining, from the located record, the number of prior executions is below a threshold value.

23. The database system of claim 21, wherein the query execution component is configured to execute the query against the database according to an access plan generated by the optimizer in response to determining none of the access plans in the located record have a corresponding execution time below a predetermined threshold value.

* * * * *